3,012,021
POLYMERIZATION OF VINYLIDENE FLUORIDE
Murray Hauptschein, Philadelphia, Pa., assignor, by mesne assignments, to Pennsalt Chemicals Corporation, a corporation of Pennsylvania
No Drawing. Filed May 16, 1956, Ser. No. 585,170
9 Claims. (Cl. 260—92.1)

This invention relates to the polymerization of vinylidene fluoride and in particular to a method for the polymerization of vinylidene fluoride in which the yields of polymer are much greater than have been obtained with hitherto known methods.

Polymeric vinylidene fluoride has been known for some time. It can be used to make elastomers, protective wrappers, filaments and the like and has great potential value in applications where stability to heat and corrosion are necessary. To date, however, the practical value of vinylidene fluoride is limited by the rather small yields of the polymer which have been obtained from known polymerization processes. Thus, for example, it is known to polymerize vinylidene fluoride by heating it in the presence of acetyl or benzoyl peroxide. However, the degree of conversion in these cases is only about 20%.

Moreover, in known processes the polymer is obtained as a hard, brittle mass and is unsuitable for many applications, e.g. molding, extrusion and the like, without expensive and time-consuming milling or grinding.

It has now been found that if vinylidene fluoride is subjected to polymerizing conditions in the presence of an alkylene oxide, up to 100% of the vinylidene fluoride will be polymerized. In addition, by conducting the reaction in the presence of an alkylene oxide, the polymer product is obtained as a free flowing powder, well suited for immediate processing.

The invention therefore provides a method for the polymerization of vinylidene fluoride which comprises subjecting vinylidene fluoride to polymerizing conditions in the presence of an alkylene oxide.

The term "polymerizing conditions" refers to conditions which will cause free radical formation in the reaction mass. These conditions may involve the use of ultra-violet light; heat; X, $\gamma$, or high energy electron radiation; or a chemical initiator or catalyst of the free radical forming type. Examples of suitable free radical forming catalysts are benzoyl peroxide, acetyl peroxide, hexachloroacetyl peroxide, hexafluoroacetyl peroxide, di-tertiary-butyl peroxide, tertiary-butyl hydroperoxide, succinic acid peroxide and $\alpha,\alpha'$-di-isobutyronitrile. Of these, di-tertiarybutyl peroxide (DTBP) is preferred, and indeed it has been found that even in the absence of an alkylene oxide, DTBP will give conversions of over 50%. DTBP also has the advantage over certain other catalysts, i.e. catalysts having hydroxyl groups, that no detectable homopolymerization of alkylene oxide is effected.

The amount of free radical catalyst which may be used is subject to considerable variation depending upon the particular catalyst. Usually, between about 0.1 and about 15.0, preferably between about 0.5 and about 10 weight percent of catalyst based on vinylidene fluoride will be used.

The alkylene oxides especially suitable for use with the present invention are those having not more than about 10 carbon atoms in the molecule, such for example as ethylene oxide, propylene oxide, isobutylene oxide, and 1,2-epoxyoctane.

As to the proportions of alkylene oxide, it is found that even a trace, e.g. on the order of $\frac{1}{100}$ of a mole per mole of vinylidene fluoride suffices to give a very substantial increase in conversion. The use of proportions up to about 10 moles of alkylene oxide per mole of vinylidene fluoride improves the physical characteristics of the product, giving a free flowing mass of discrete particles of uniform size which is suitable for use in various applications without grinding or shredding. There is no upper limit on the proportions of alkylene oxide which can be used, but on the other hand there is no practical reason for using more than about 10 moles per mole of vinylidene fluoride.

The conditions of reaction for the polymerization are those well known to the art. Generally the reaction is conducted at a temperature sufficient to form free radicals. This may be between about $-50°$ C. and about $200°$ C. depending on the particular agency used to promote free radical formation. Thus, where light, X, $\gamma$, or $\beta$ radiation is used, temperatures over the entire range may be employed. Where a chemical initiator is used, the temperature will be at least that required to form free radicals from the particular initiator. Where heat, but no initiator is used, the temperature is generally above room temperature and usually above about $100°$ C.

The pressure may be varied within broad limits between atomspheric and about 1000 atmospheres.

Reaction time may also be varied to a considerable extent, depending on the degree of conversion it is desired to obtain. For flow processes, it may be a fraction of a minute. For batch processes, it will normally be on the order of 1 to 100 hours.

The invention will be further described with reference to the following specific examples, it being understood that the examples are given for purposes of illustration and are not to be taken as in any way restricting the invention beyond the scope of the appended claims.

In the examples, the vinylidene fluoride, a free radical forming initiator, and the alkylene oxide wer put into a stainless steel bomb of about 250 ml. capacity, and heated to $135°$ C. $\pm 5°$ C. The pressure ranged from about 100 p.s.i.g. to about 1500 p.s.i.g.

Further experimental details are presented in the following table.

SPECIFIC EXAMPLES

| Ex. | Moles $CF_2=CH_2$ | $C_2H_4O/CF_2=CH_2$ Ratio | DTBP, Wt. Percent $CF_2=CH_2$ | Reaction Time (Hrs.) | Percent Conversion (based on $CF_2=CH_2$) | Analysis, percent by wt. | |
|---|---|---|---|---|---|---|---|
| | | | | | | C | H |
| 1 | 0.52 | 0 | 9.1 | 140 | 53 | 38.5 | 3.5 |
| 2 | 0.59 | 0 | 7.9 | 60 | 54 | | |
| 3 | 0.52 | 0.04 | 9.1 | 24 | 84 | | |
| 4 | 0.59 | 0.14 | 7.9 | 19 | 80 | 38.2 | 3.3 |
| 5 | 0.59 | 0.46 | 1.3 | 60 | 71 | | |
| 6 | 0.62 | 0.50 | 7.9 | 18 | 90 | | |
| 7 | 0.72 | 1.4 | 6.8 | 18 | 83 | | |
| 8 | 0.48 | 1.7 | 10 | 96 | 100 | 39.6 | 3.6 |
| 9 | 0.22 | 4.8 | 14 | 60 | 87 | 39.6 | 3.5 |
| 10 | 0.23 | 5.1 | 6.7 | 19 | 80 | 38.2 | 3.2 |

Theoretically, $-(CF_2CH_2)_n-$ requires C, 37.51%; H, 3.15% by weight. The slightly higher percentages of carbon and hydrogen found in the examples are thought due to the incorporation of end groups from the DTBP catalyst.

In all the examples, the polymer obtained was washed for several hours with boiling water. No decrease in weight was noted, indicating the absence of an ethylene oxide homopolymer. The infra-red spectra of the polymers obtained in Examples 9 and 10 were examined and found to be identical with the spectra of Example 1, where no ethylene oxide was used. Thus, only homopolymerization of vinylidene fluoride occurred.

*Example 11*

Vinylidene fluoride (38 g., 0.59 mole) and ethylene oxide (47 g., 1.07 moles) were heated in the presence of 4.4 g. of tertiary-butyl hydroperoxide at 120° C. for 4 days. The crude polymer (39 g.) was washed with boiling water for several hours and 20.5 g. of slightly impure polyvinylidene fluoride having a softening point around 140° C. were isolated. Analysis showed C, 39.93%; H, 3.56% by weight. The conversion, calculated on the monomeric vinylidene fluoride, was 54%.

The wash water from the crude polymer was examined and found to contain polyethylene glycol, showing homopolymerization of the ethylene oxide.

*Example 12*

Vinylidene fluoride (38 g.) and ethylene oxide (47 g.) were heated at 140° C. for 19 hours in the presence of 4 g. of succinic acid peroxide. The crude polymer obtained (32 g.) was washed in boiling water to give 27.5 g. of slightly impure polyvinylidene fluoride for a conversion of 72%. Analysis showed C, 39.77%; H, 3.58% by weight. The wash water contained polyethylene glycols, showing homopolymerization of ethylene oxide.

*Example 13*

Following the procedure of Examples 3–10, but using propylene oxide, similar results are obtained.

What is claimed is:

1. A method for the homopolymerization of vinylidene fluoride which comprises subjecting a monomer consisting essentially of vinylidene fluoride to conditions causing the formation of free radicals in the presence of a 1,2 alkane epoxide having from 2 to about 10 carbon atoms in the molecule 2. The method claimed in claim 1 wherein the alkane epoxide is ethylene oxide.

3. The method claimed in claim 1 wherein the alkane epoxide is propylene oxide.

4. A method for the homopolymerization of vinylidene fluoride which comprises contacting a monomer consisting essentially of vinylidene fluoride with a free-radical-forming catalyst under conditions which will cause said catalyst to form free radicals and in the presence of a 1,2 alkane epoxide having from 2 to about 10 carbon atoms in the molecule.

5. The method claimed in claim 4 wherein the catalyst is selected from the group consisting of di-tertiary-butyl peroxide, tertiary-butyl hydroperoxide, and succinic acid peroxide.

6. The method claimed in claim 5 wherein the catalyst is di-tertiary-butyl peroxide.

7. The method claime in claim 4 wherein the alkane epoxide is ethylene oxide.

8. The method claimed in claim 4 wherein the alkane epoxide is propylene oxide.

9. A method for the homopolymerization of vinylidene fluoride which comprises heating a monomer consisting essentially of vinylidene fluoride with di-tertiary-butyl peroxide in the presence of ethylene oxide at a temperature causing the formation of free radicals.

References Cited in the file of this patent

UNITED STATES PATENTS

| | | |
|---|---|---|
| 2,435,537 | Ford et al. | Feb. 3, 1948 |
| 2,556,048 | Stanton et al. | June 5, 1951 |
| 2,585,529 | Austin | Feb. 12, 1952 |
| 2,753,329 | Kroll et al. | July 3, 1956 |
| 2,777,835 | Calfee | Jan. 15, 1957 |
| 2,820,026 | Passino et al. | Jan. 14, 1958 |

FOREIGN PATENTS

| | | |
|---|---|---|
| 583,874 | Great Britain | Jan. 1, 1947 |

OTHER REFERENCES

Hauptschein et al.: J. Am. Chem. Soc., 78, p. 676, Feb. 5, 1956.

Fletcher et al.: Journal of American Chem. Soc., 58, 2135–40 (1936), abstracted in C.A. 31:936(5).